(12) United States Patent
Caine et al.

(10) Patent No.: US 11,619,924 B2
(45) Date of Patent: Apr. 4, 2023

(54) COMBINED VISUALIZATION THIN CLIENT HMI SYSTEM AND METHOD

(71) Applicant: ROCKWELL AUTOMATION, INC., Milwaukee, WI (US)

(72) Inventors: Tim Caine, Cumming, GA (US); Randy Cannady, Canton, GA (US)

(73) Assignee: Rockwell Automation, Inc., Milwaukee, WI (US)

( * ) Notice: Subject to any disclaimer, the term of this patent is extended or adjusted under 35 U.S.C. 154(b) by 821 days.

(21) Appl. No.: 15/486,922

(22) Filed: Apr. 13, 2017

(65) Prior Publication Data
US 2018/0299863 A1 Oct. 18, 2018

(51) Int. Cl.
| | |
|---|---|
| H04L 9/40 | (2022.01) |
| G05B 19/409 | (2006.01) |
| H04L 67/08 | (2022.01) |
| G05B 23/02 | (2006.01) |
| H04L 67/12 | (2022.01) |
| G05B 19/042 | (2006.01) |
| G06F 9/451 | (2018.01) |

(52) U.S. Cl.
CPC ....... *G05B 19/409* (2013.01); *G05B 19/0426* (2013.01); *G05B 23/0216* (2013.01); *G06F 9/451* (2018.02); *H04L 63/102* (2013.01); *H04L 63/107* (2013.01); *H04L 67/08* (2013.01); *H04L 67/12* (2013.01); *G05B 2219/36133* (2013.01); *G05B 2219/36143* (2013.01); *G05B 2219/36159* (2013.01)

(58) Field of Classification Search
CPC .............................. G05B 19/409; H04L 63/102
See application file for complete search history.

(56) References Cited

U.S. PATENT DOCUMENTS

| | | | |
|---|---|---|---|
| 7,676,294 B2* | 3/2010 | Baier ............... | G05B 19/41865 700/108 |
| 8,126,964 B2* | 2/2012 | Pretlove .............. | H04L 67/2842 709/204 |
| 8,260,736 B1* | 9/2012 | Lear ......................... | G06N 5/02 706/46 |

(Continued)

OTHER PUBLICATIONS

Baratto, Ricardo A., Leonard N. Kim, and Jason Nieh. "Thinc: A virtual display architecture for thin-client computing." Proceedings of the twentieth ACM symposium on Operating systems principles. 2005 (Year: 2005).*

(Continued)

*Primary Examiner* — Syed A Zaidi
(74) *Attorney, Agent, or Firm* — Fletcher Yoder, P.C.

(57) ABSTRACT

A combined visualization configuration is stored and provided by a visualization manager to a thin client HMI. Based upon the configuration, the thin client HMI accesses individual visualizations from automation components, such as automation controllers, motor controllers, camera, and so forth. Policies may be established for users and their roles, and for particular thin client HMIs, and for particular locations of or around a machine or process being monitored and/or controlled. Based on the policies, the individual visualizations are combined and may be changed if one or more of the factors changes. Interactions with the individual visualizations of the combined visualization result in signals back to the automation components originating the visualizations.

19 Claims, 11 Drawing Sheets

(56) References Cited

U.S. PATENT DOCUMENTS

| | | | | |
|---|---|---|---|---|
| 8,321,806 B2* | 11/2012 | Agrusa | ............. | G05B 23/0267 |
| | | | | 700/17 |
| 8,624,921 B2* | 1/2014 | McGreevy | ............... | G09G 5/14 |
| | | | | 345/629 |
| 9,323,245 B2* | 4/2016 | Bush | .................. | G05B 23/0216 |
| 2009/0083589 A1* | 3/2009 | Fulton | .................... | G05B 19/05 |
| | | | | 714/48 |
| 2009/0083705 A1* | 3/2009 | Phillips | ..................... | G06F 8/71 |
| | | | | 717/113 |
| 2009/0089709 A1* | 4/2009 | Baier | .................. | G05B 19/409 |
| | | | | 715/817 |
| 2012/0242648 A1* | 9/2012 | Baier | .................. | G05B 19/409 |
| | | | | 345/418 |
| 2013/0297050 A1* | 11/2013 | Reichard | ................ | G05B 15/02 |
| | | | | 700/83 |
| 2014/0180445 A1* | 6/2014 | Gardiner | ................. | G06F 40/40 |
| | | | | 700/83 |
| 2015/0347935 A1* | 12/2015 | Standing | .............. | G05B 19/042 |
| | | | | 705/7.27 |

OTHER PUBLICATIONS

NPL Search Terms (Year: 2022).*

* cited by examiner

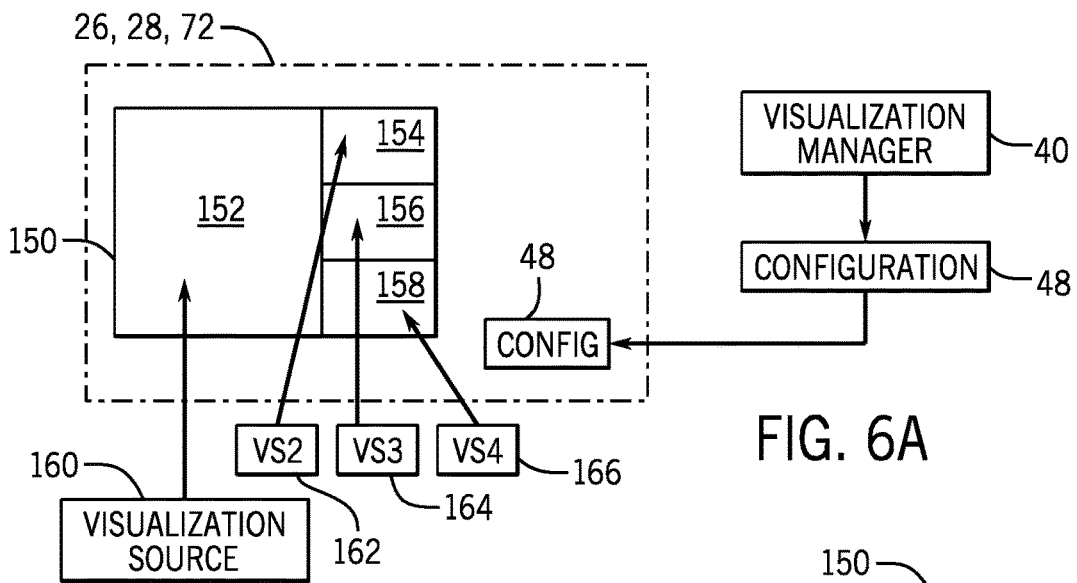
FIG. 6A
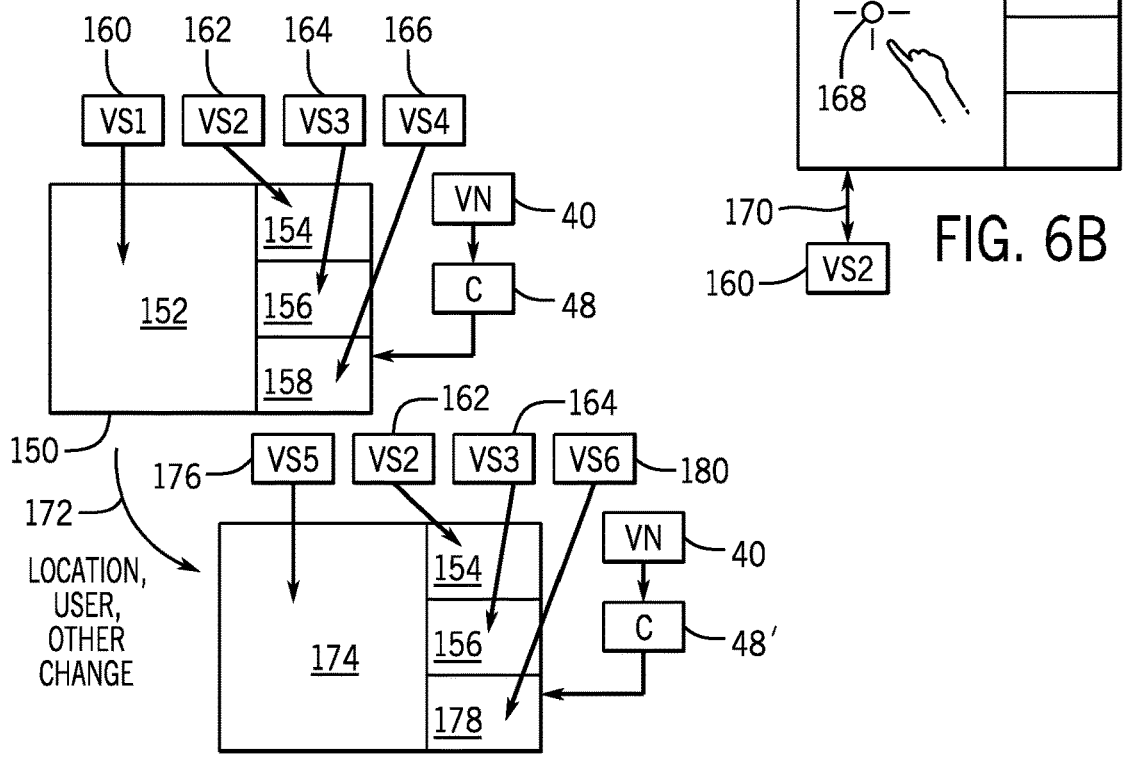
FIG. 6B
FIG. 6C
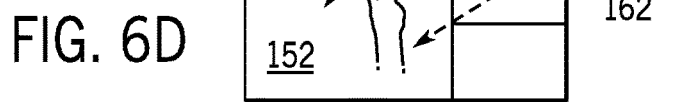
FIG. 6D

COMBINED VISUALIZATION THIN CLIENT HMI SYSTEM AND METHOD

BACKGROUND

This disclosure relates generally to human machine interfaces, such as those used in industrial automation systems.

Advances in automation systems have enabled coordinated control and monitoring of a wide range of machines and processes. Modern industrial automation is commonly computer control of motors, valves, and other actuators based upon preset programming, modeling, sensing and feedback of many different parameters, typically depending upon the machine or process being controlled. Operators interact with the systems in control rooms, but increasingly by local or mobile devices that may be positioned in any convenient location. Remote control and monitoring is also common.

In all such applications, human operators need some type of interface with which to interact (e.g., monitor, control, analyze, examine) the machine or process. In conventional industrial automation environments, such interaction is often performed via a human machine interface, sometimes referred to as an HMI. These often are based on screens that are pre-defined and stored on a monitor-like device. The screens may show diagrams of the controlled machine or process, components, values, process flows, and so forth. In some cases, the screens allowed for the user to interact via touching one or move designated locations on the screen, or though other input devices. Different screens or pages could be accessed in this way, such as to view different aspects of the machine or process, feedback, process data, performance data, and so forth.

Increasingly, mobile devices and "thin clients" have been used in such settings. The migration to such devices removes some or all of the executable payload from the interface device, but allows for added flexibility, particularly where the interface device is small or mobile. However, even in such environments, the interface devices still simply reproduced the views or screens that were served by the originating devices, such as automation controllers, HMI's, cameras, and so forth. There remains little or no ability to alter or combine such data in a flexible and useful manner, and there is a keen need for solutions that may permit increased utility offered by such technology.

BRIEF DESCRIPTION

The present disclosure relates to HMI technology that addresses such needs. In accordance with certain aspects of the technology, a system comprises a visualization manager comprising a predetermined configuration of a layout of a combined automation visualization and that, in operation, provides the configuration to a thin client HMI to cause the thin client HMI to access a plurality of visualizations from a respective plurality of industrial automation visualization sources of a controlled machine or process, the configuration defining specific individual visualizations to be included in the combined visualization, the location and layout of the individual visualizations in the combined visualization, and the industrial automation sources of the individual visualizations.

In accordance with another aspect of the technology, a system comprises a plurality of industrial automation components each performing a monitoring and/or control operation on a controlled machine or process, each of the industrial automation components creating a respective visualization of an aspect of the monitored and/or controlled operation. A visualization manager comprises a predetermined configuration of a layout of a combined automation visualization and that, in operation, provides the configuration to a thin client HMI to cause the thin client HMI to access the respective visualizations from the plurality of industrial automation components, the configuration defining specific respective visualizations to be included in the combined visualization, the location and layout of each respective visualization in the combined visualization, and the industrial automation component that creates each respective visualization.

Methods are also provided by the technology, such as a method comprising storing a configuration of a combined visualization created by a human operator on a visualization manager, the combined visualization comprising area for placement of respective individual visualizations from respective industrial automation components each performing a monitoring and/or control operation on a controlled machine or process, each of the industrial automation components creating a respective individual visualization of an aspect of the monitored and/or controlled operation. The configuration to a thin client HMI, which accesses from each of the respective industrial automation components the respective individual visualizations during monitoring and/or control of the controlled machine process, and compiles the combined visualization based upon the configuration.

DRAWINGS

These and other features, aspects, and advantages of the present invention will become better understood when the following detailed description is read with reference to the accompanying drawings in which like characters represent like parts throughout the drawings, wherein:

FIG. 6A-6D illustrate example combined visualizations, and some ways in which they may be automatically or manually altered.

DETAILED DESCRIPTION

Figure 1:
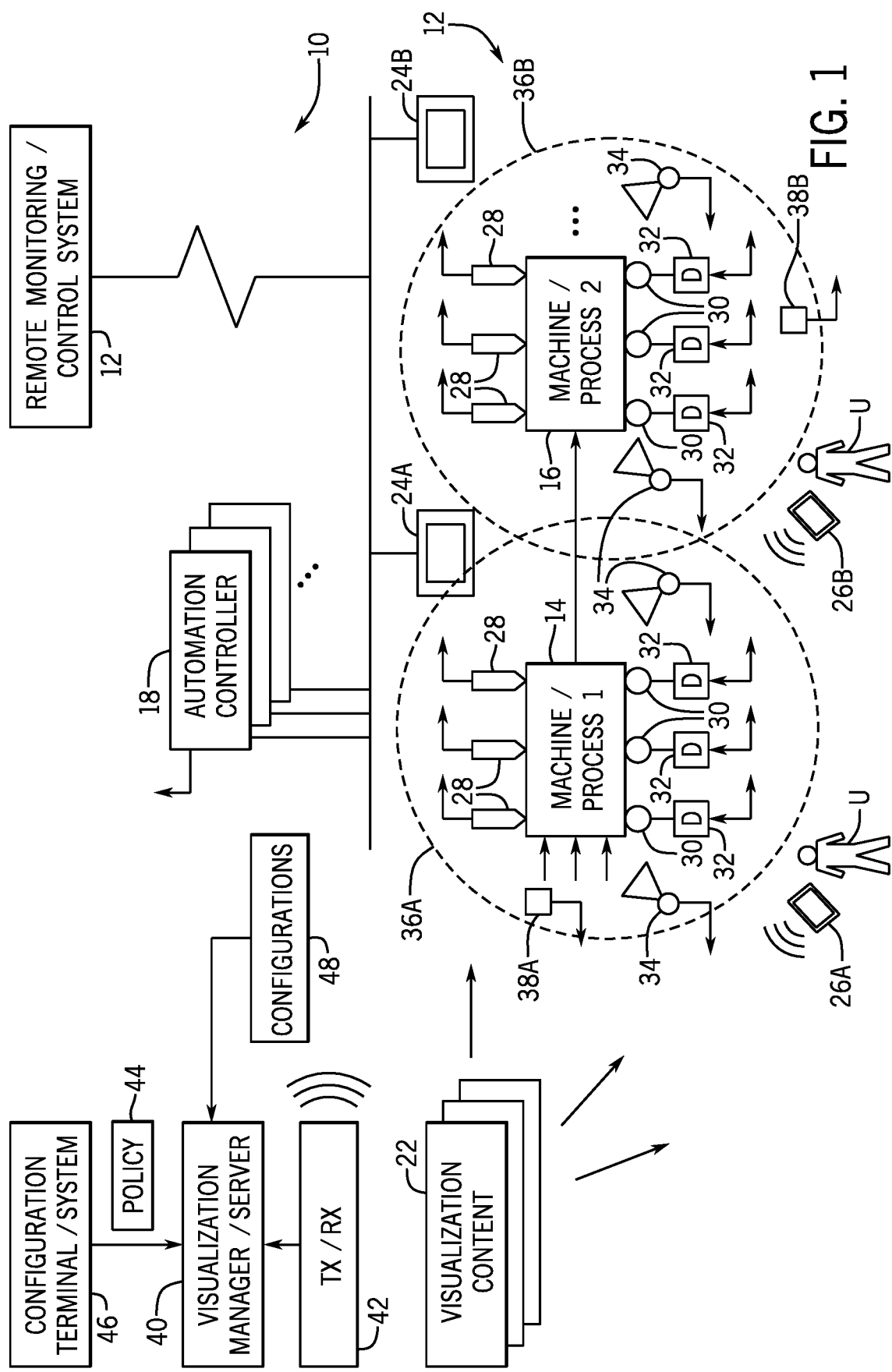
FIG. 1 is a diagrammatical representation of an example automation system for monitoring and controlling a machine or process and utilizing visualization technology of the type disclosed.

FIG. 1 illustrates an example automation system 10 employing visualization technology that enables users to view multiple views and screens combined in a single presentation that can be created, viewed, interacted with, and altered in automated and manual ways. The system may be incorporated for the control and/or monitoring of any machine or process system 12, which itself may comprise multiple machines or processes 14 and 16. In many applications, these may be controlled by dedicated control devices, such as one or more automation controllers 18. These controllers may be located at, in or on the controlled and/or monitored system (e.g., mounted on the equipment or in close proximity to it, on a factory or facility floor, etc.), or in some cases may be at least partially remote from the equipment (e.g., in control rooms, etc.). In some embodiments, such monitoring and control components may be coupled to one or more machines (and other equipment) via networks 20.

As discussed in greater detail below, the system 10 allows for useful data in the form of visualizations to be delivered to personnel utilizing, overseeing, controlling, maintaining, or otherwise interacting with the machines and processes. In particular, data comprising visualizations of the systems, parts of the systems, schematic views of the systems, actual images of the systems, data relating to the operation of the system (both in real or near-real time and historically) may be provided that include visualizations acquired from multiple different sources and combined in a user-configurable manner. In the illustrated embodiment, visualization content, indicated generally by reference numeral 22, may be provided to multiple different users U, such as via one or more fixed-location HMIs, as indicated by reference numeral 24A and 24B, and by mobile or hand-held devices 26A and 26B. These may be hard-mounted on or near the controlled or monitored equipment, or may be generally retained in a location (e.g., via a tether). It may be noted that the thin-client HMIs may receive the visualization content via any suitable wireless technology (as represented for devices 26A and 26B), or via wired connections (e.g., network cabling and protocols), as indicated for devices 24A and 24B. The devices may be referred to as "thin clients", and may themselves be computer terminals, screens, monitors, tablet devices, smartphones, laptops, or any other device capable of receiving and displaying the visualization content. As used herein the term "thin client" is intended to convey that the visualization-generating applications or executable code is not run by or instantiated on the thin client device itself (though the device may be capable of such functionality, computation, online operation, browser searching and display, telephonic or video calling, etc.). Instead, the thin client devices receive data defining an image or screen (i.e., visualizations) that is simply interpreted and displayed by the devices. Advantageously, the devices may interact with the visualizations, such as by touching locations on a touch-screen of the devices, keyed inputs, voice commands, and so forth. In the automation context, such devices may be referred to as human machine interfaces ("HMIs"), or "thin client HMIs". As discussed below, the thin clients also receive configurations from a further component, and based on the configurations access and display the visualization content from the visualization sources, including placement of different visualizations in locations or insets in combined visualizations that are defined by the configurations provided by the further component (that is, the visualization manager discussed below).

In many applications, the machines or processes will be instrumented with a range of sensors 28 that detect operating parameters of the equipment (e.g., voltages, currents, speeds, flow rates, positions, levels, item counts, etc.). Similarly, multiple actuators 30 will typically be present, such as motors, valves, positioning devices, and so forth. For such devices (particularly motors), drives 32 or other control components may be provided that apply controlled power to the actuators to carry out various automation functions (e.g., manufacturing, processing, material handling, etc.). Although the drives are illustrated as near the controlled actuators, in practice they may be situated in cabinets, racks, and so forth, and in some cases the same enclosures or system locations as the automation controllers. Though not separately illustrated, the system will also typically include various power and monitoring devices, such as switchgear, relays, contactors, disconnects, and so forth, as well as meters, gauges, read-out devices, and the like.

Also illustrated in FIG. 1 are cameras 34 that may be positioned to capture still or moving images of all or a part of the equipment making up each machine or process, products made or handled by them, personnel interacting with them, and so forth. The captured images are reduced to transmissible data by each camera and the image data may be transmitted to any desired device, such as for inclusion in a combined visualization as discussed below.

It should be noted that the arrows to and from the sensors, actuators/drives, and cameras are intended to indicate that data is exchanged with these components. The data may include control signals, feedback signals, monitored data, instructions, or any other useful data that may serve an automation (e.g., control and/or monitoring) function. In some embodiments and for some components, the data is exchanged with automation controllers 18 or other control and/or monitoring equipment, while other data may be provided directly to servers and other devices that receive visualization content and compile the combined visualizations discussed below. In certain presently contemplated embodiments, the visualizations are accessed by the thin clients based upon pre-determined configurations and policies, and combined visualizations are made by the thin clients based upon these configurations.

In embodiments made up of multiple systems 14, 16, these may be positioned in or logically associated in zones 36A and 36B that may at least partially overlap as illustrated. Each zone, or portions of zones may be served by one or more components that allow for detecting the presence of a user U and/or a thin client HMI 26A, 26B, as indicated by reference numerals 38A and 38B. Such devices may be referred to as "resolvers" and serve to provide signals that can be detected by the thin client HMIs, or by other devices, or that provide indicia (e.g., bar codes) that can be detected or scanned to produce signals indicative of location. In general, the function of the resolvers is to either directly or indirectly provide indications of the presence of the user U or the thin client HMI in a zone or zones of the system. As discussed below, the visualization content, and particularly the combined visualizations created may be adapted according to such factors as the user, the user's role, the location, the thin client HMI device, time, machine conditions, and so forth.

In the illustration of FIG. 1, some of the components of the automation system may be in data communication via one or more networks, as illustrated for the automation controllers 18 and HMIs 24A and 24B. Many other automation components may be networked in this manner, including components on or near the controlled or monitored machines or processes, and components and systems located on-site or remote from the machines or processes, as indicated by block R. Whether connected by wired or wireless network links, any of these components that generates visualizations may be accessed to provide the visualizations to the thin client HMIs.

In the illustrated embodiment, an example device for providing configurations of the visualizations, and particularly for combined visualizations takes the form of a "visualization manager" or server 40. The visualization manager may itself comprise one or more servers or other processing components capable of accessing data defining visualization content from multiple other components that themselves produce the content. The visualization manager is coupled to or includes interface circuitry 42 for transmitting configurations for combined visualizations to the thin client HMIs. As discussed below, in operation, the visualization manager receives data indicative of such factors as identifications of the thin client HMIs, their location, their users or the user roles, and so forth, and sends configuration data to the thin client HMIs which compile and display combined visualizations based upon underlying policies on which the configurations are based. Here again, and as also discussed below, these policies allow for highly customized provision of visualizations from visualization sources and for creation of one or more combined visualizations and alteration of the visualizations or portions of them based on factors such as the particular user, the user's particular role, the particular location where the combined visualizations may be viewed and/or interacted with, the particular thin client HMI device, the particular time, particular machine conditions, and so forth. It may be noted that one or more of the visualizations making up the combined visualization may also be adapted based upon such factors, though other visualizations of the combined visualization may be unchanged or otherwise specified. Also, as discussed below, the configurations provided by the visualization manager may allow the user or operator to alter or otherwise interact with one or more of the visualizations of the combined visualization.

The policies may be developed and configured, along with definition and configurations of the combined visualizations via a configuration terminal/system 46. Software, firmware or a combination may be executed on the configuration terminal to select the particular visualizations desired, the users, the user roles, the locations, the devices, and any other relevant factors or data that will form the basis for acquiring the desired visualizations from source devices, compiling the combined visualizations, and displaying the combined visualizations on the devices in accordance with the relevant factors. The collection of rules established in this way are the "policies" implemented by the visualization manager.

In operation, the visualization manager itself will not typically execute or instantiate applications that produce the visualization content that is combined to form the combined visualizations, but sends configuration data 48 to the thin clients to access such content from other devices where the applications are running. These may include, for example, automation controllers, and other computers controlling and/or monitoring the machines or processes, computers on which models, schematics, documentation, historical data, or any other useful visualization content are stored or created. The configurations provided to the thin clients by the visualization manager may also cause the thin clients to access camera inputs in the form of streaming image data that can be incorporated into one or more combined visualizations. The ability to store and provide configurations for receiving and combining these visualizations allows the visualization manager to play a role that is provided by none of the contributing visualization data sources, and in a manner that reduces or eliminates the need for a programmer or user to separately access or separately display the individual visualizations (e.g., reducing the need to page or flip through different screens providing different information).

Figure 2:
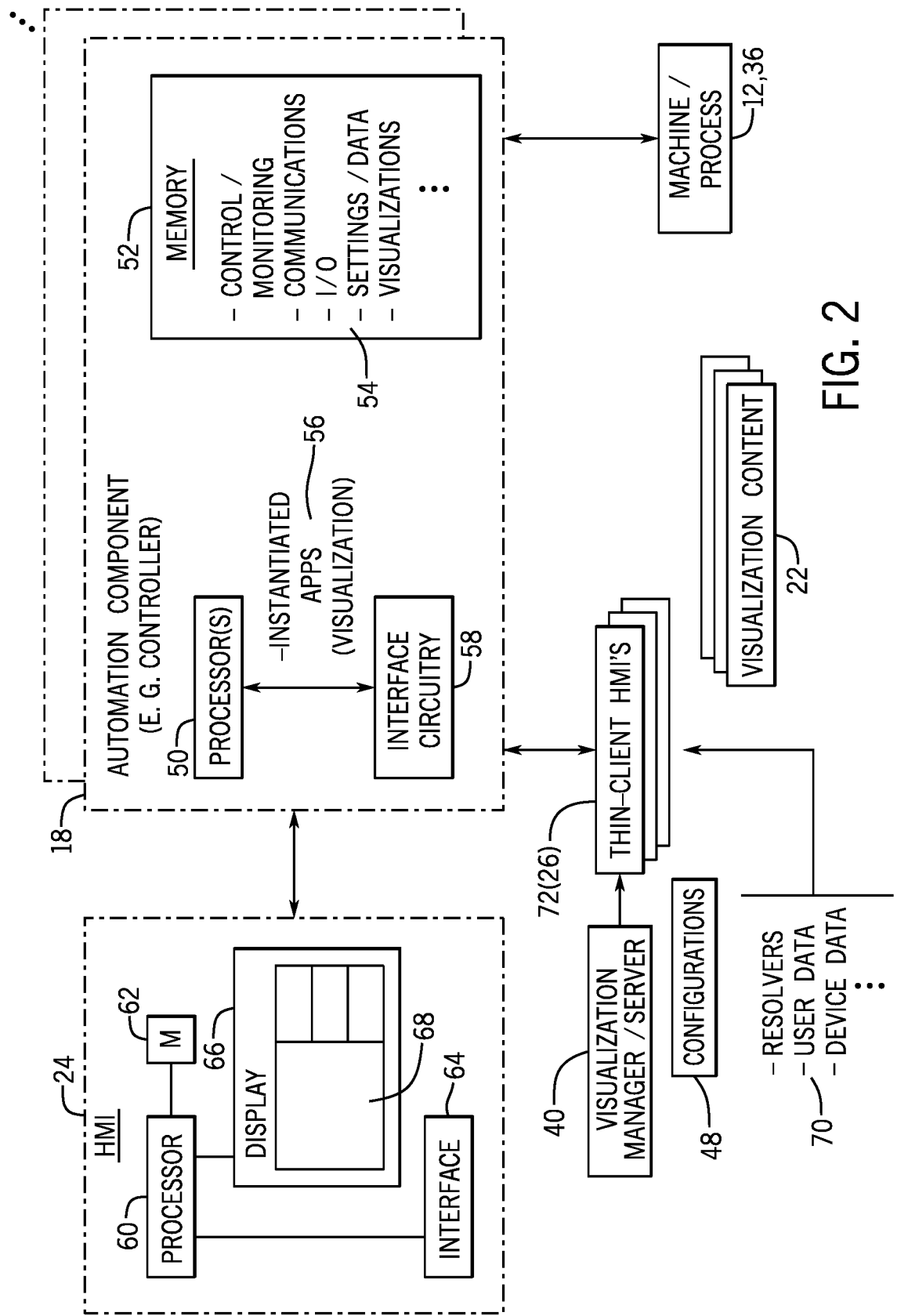
FIG. 2 is a diagrammatical representation of certain of the functional components of an example visualization system including a server or visualization manager for providing configurations for combined visualizations to a thin client HMI.

FIG. 2 illustrates certain components of the system of FIG. 1 in somewhat greater detail. In the illustrated embodiment, one or more automation components 18, such as an automation controller, provides visualization content (e.g., whole or partial pages or screens, components of visualizations, such as virtual instruments, virtual push buttons, schematics or virtual representations of the machine or system, or a portion of it, etc.). The content may be provided by a processor 50 acting on instructions stored in one or more memory circuits 52, which may be on-board or off-board of the automation component. In general, for automation applications, as indicated generally by reference 54, the memory may store control and monitoring instructions (e.g., code that, when instantiated or executed performs pre-determined monitoring and/or control functions), communication instructions (e.g., for exchanging data in accordance with standard communications protocols), input/output data (e.g., for addressing, accessing, and storing data from sensors, and commands for actuators), various system and component settings and related data, and the visualization definitions for creating the desired visualizations based upon available data. The processor (or multiple processors, or multiple cores of a multi-core processor) may then instantiate or execute one or more applications for generating the desired visualization. In the present embodiment, as least these applications are run on the automation component, which then comprises a visualization content source for the thin client HMIs. The component will also include interface circuitry that allows for exchange of data (including the visualization content) with external devices, such as the thin client HMIs.

As noted above, the visualization manager provides the thin client HMIs with configurations that instruct the thin client HMIs to compile combined visualizations based upon the visualizations received from the content sources, and to display this content in accordance with the policies stored on the visualization manager. One such device may be an adapted HMI 24. The HMI may be the same as or similar to prior art HIMs, but in the case of the combined visualizations contemplated by the present disclosure, these will only receive and display the visualizations without creating them internally. That is, insomuch as the combined visualizations are concerned, the HMIs 24 may act here as thin clients. They may comprise one or more processors 60 for processing (e.g., combining) the received visualizations, as well as memory circuitry 62 storing instructions and configuration data for such operations. One or more interface circuits 64 allow for data communication with other devices (e.g., the automation component where desired, and the visualization manager 40). A display 66, typically in the form of a screen display allows for provision of screens or pages, or portions of these to the user, including the combined visualization 68. It should be noted that in the overall system, any HMIs may also be of a conventional type that are in direct communication with a component (e.g., an automation controller) for receiving and displaying content, and for acting on the content in conventional manners. In such cases, the system offers back-compatibility by allowing the use of conventional HMIs, as well as thin client HMIs. Also, illustrated in FIG. 2 are a series of data sources 70 from which the thin client HMIs, based upon the configurations from the visualization manager 40, may build the combined visualizations, and display the visualizations in accordance with the established policies. These may include, for example, cameras, resolvers, user data (e.g., input automatically, semi-automatically, or manually by human operators), device data (e.g., preconfigured or provided by manual input or automated detection).

Figure 3:
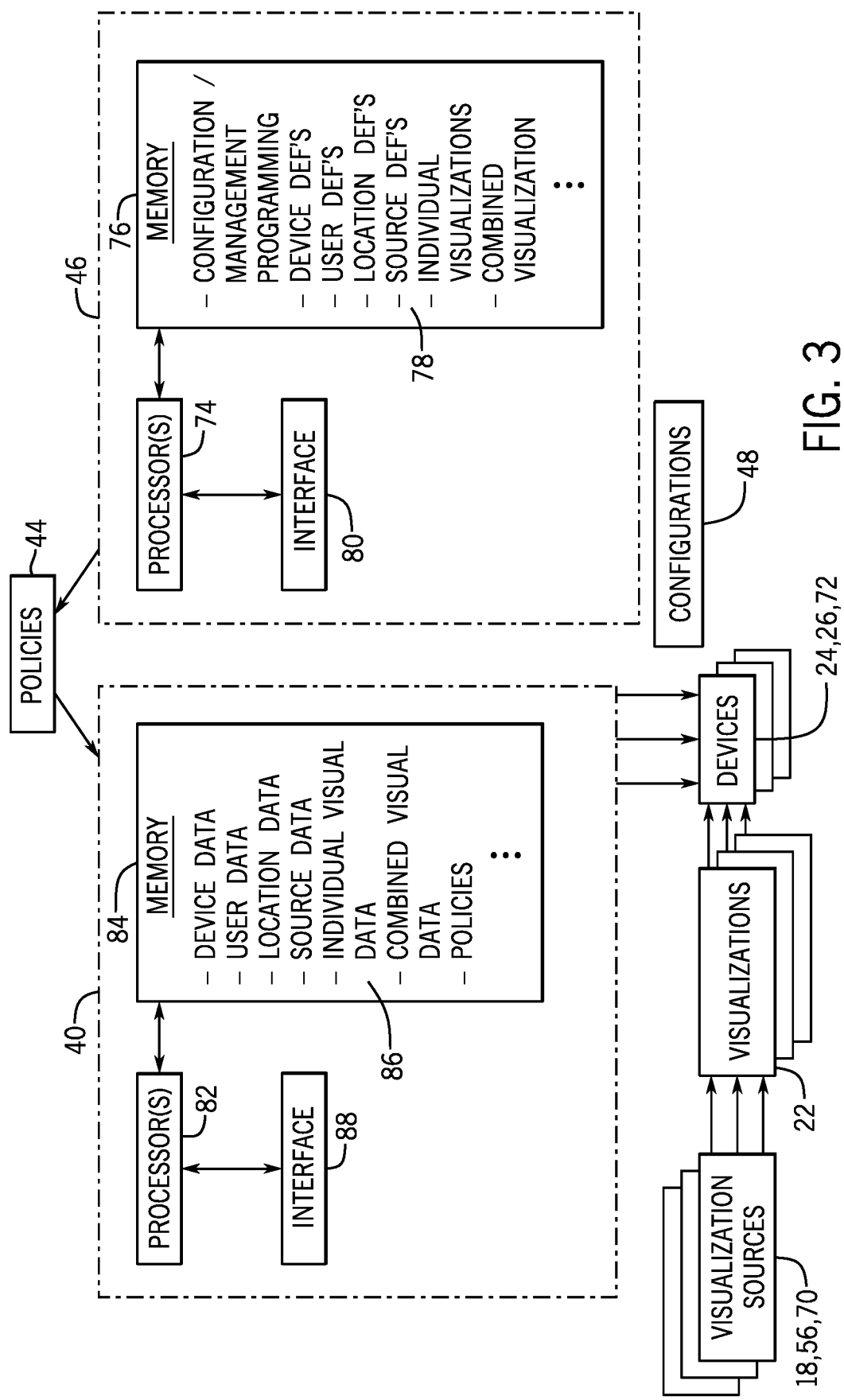
FIG. 3 is a diagrammatical representation of certain components of an example server or visualization manager and configuration terminal for configuring, accessing and serving combined visualization configurations to thin client HMIs.

FIG. 3 illustrates certain example components of the configuration terminal 46 and the visualization manager 40, and their interaction. The terminal 46 may be any dedicated or general purpose computer on which configuration applications are executed by one or more processors 74 based upon programming stored in one or more memory circuits 76. The memory may store the configuration programming and relevant data and definitions, as indicated by reference 78. The configuration application may comprise many different screens and interfaces (some illustrated and discussed below) that allow for establishing the policies 44, and for defining the combined visualizations that are compiled based upon individual visualizations received from various content sources (e.g., automation controllers, cameras, etc.). As noted above, the policies may be established based upon identification and definition of the thin client devices, the users, the locations, data and content sources, the individual visualizations to be combined, and the definition or configuration of the combined visualizations. The terminal may comprise any desired interfaces 80 for permitting user (programmer) interaction for establishing the policies, as well as for communicating the policies and any associated data to the visualization manager 40.

The visualization manager 40 receives the policies 44 and configurations of combined visualizations, acts on them to allow the thin client HMIs 24, 26, 72 to access, compile, display, and interact with the visualizations. The visualization manager will include one or more processors 82 and memory circuitry 84 that stores code 86 executed by the processors for implementing the policies, accessing the combined visualization configurations, and other relevant data for implementing the policies. In the illustrated embodiment, the code stored in the memory may include device data, user data, location data, content/visualization source data, individual visualization data, combined visualization data, and in general, the policies that relate all such data for the access of the visualization content by the thin client HMIs from the visualization sources (e.g., automation controllers), and allow for interaction with the visualizations. Here again, any desired interface circuitry 88 may be provided to permit user interaction with the visualization manager, and for network communication (wired and/or wireless) of the configurations.

The policies and their use in providing relevant visualizations to the thin client HMIs and their users may proceed as outlined in the publication Relevance for ThinManager 8 from Automation Control Products of Alpharetta, Ga., and online from http://www.thinmanager.com/support/manuals/files/TM_8_Relevance_Manual.pdf, which is hereby incorporated into the present disclosure by reference, in its entirety. An example of the overall system and method for this is also provided in U.S. patent application Ser. No. 14/549,297, entitled "Systems and Methods for Automated Access to Relevant Information in a Mobile Computing Environment, filed Nov. 20, 2014 by Caine et al., which is also hereby incorporated into the present disclosure by reference.

Figure 4:
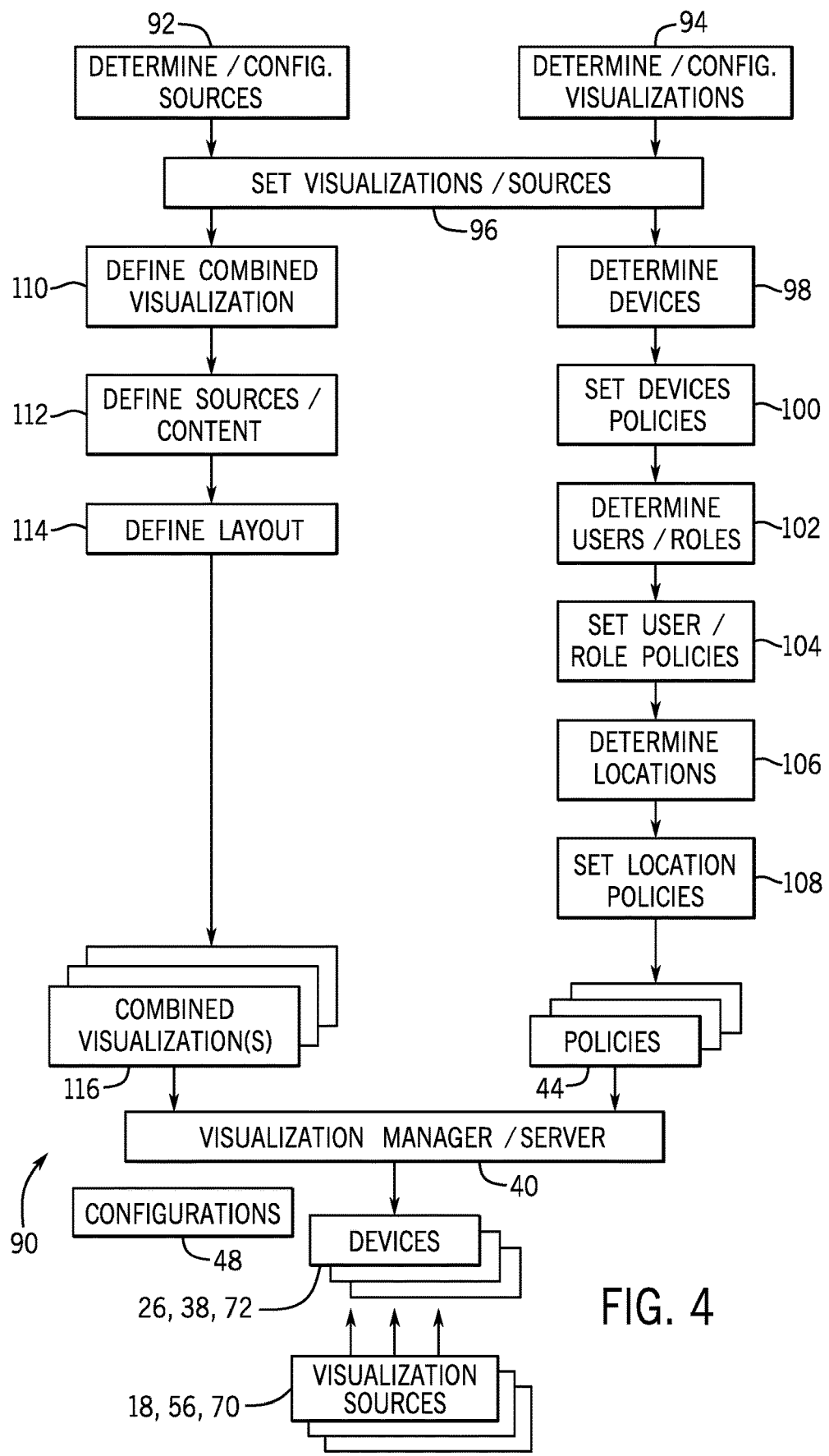
FIG. 4 is a flow chart illustrating example logic in the configuration of a combined visualization.

FIG. 4 illustrates example operations that may be implemented by the configuration terminal and any associated devices to establish the policies and combined visualizations. The example logic 90 may begin with determining and configuring the visualization and content sources. Here again, these may include automation controllers, cameras, computers and other control/monitoring devices, and so forth. It should be noted, too, that some of the visualizations may be provided by other HMIs as well, such as conventional HMIs that themselves may store and/or generate screen images that may become part of a combined visualization and served to thin client HMIs. At 94, the process may include determining particular content and visualizations that may become part of the combined visualization. These will typically be associated with one or more of the sources where applications or software is executed to produce the content and visualizations. At step 96 these visualizations and sources are established, and may be referenced, named, and relevant data stored for later accessed in both establishing the combined visualizations and for compiling and displaying them in real or near-real time.

For establishing the policies, as discussed above, and as summarized in steps 98-108, the configuration process may determine the thin client devices (e.g., by reference to a device identification) as step 98, and set the device policies at step 100. These may include, for example, what content or combined visualizations the device can and should receive and compile, the formatting of these, permitted operations (e.g., control inputs or other activities available on the device) and so forth. At step 102 the process may establish users and their roles, such as by reference to names, login data, employee data, and so forth. Because some of the content may be more relevant (or access-limited) to particular users, and users in a particular role (e.g., management, supervisory, maintenance, production, etc.), policies for the users and roles may be set to permit, disallow, or customize what content is available to different users and groups of users, as indicated at 104. Similarly, at step 106 the process may define different locations (corresponding, for example, to the locations of the resolvers) at which the content may be delivered, and set appropriate policies accordingly, as indicated at 108. Many different combinations of such factors may be used to establish highly flexible and relevant delivery of desired visualizations to the desired users, having desired roles, and at desired locations. Other factors may, of course, be considered, such as times, dates, conditions or status of the machines, and so forth.

The process also permits establishing of the combined visualizations to be created by the devices. For example, as illustrated at step 110, the logic may allow definition of one or more combined visualizations. At step 112 the sources of the different content and visualizations to be displayed and interacted with in the combined visualization may be defined and selected. At step 114, then, the individual content and visualizations may be combined in either a preset layout or a customized layout. Where desired, these may be "tiled" and displayed side-by-side, or in any desired format or layout. In some applications portions of the layout may be larger than others, and provisions may be made to allow users to "swap" the positions of the individual visualizations, such as to better view one of the visualizations over another (e.g., larger than another). All of the parameters of the layout will then be stored to retain a configurations of the combined visualizations, as indicated at 116 (e.g., the sources of each individual visualization or element of content, the location and size of each in the combined visualizations, etc.).

In use, then, all of the policies 44 and combined visualization configurations 116 are provided to the visualization manager 40 for use in providing the configurations (combined visualizations and other relevant data) to the thin client HMIs according to the policies. Any or all of these visualizations may be acted upon, if permitted, by the user via the thin client HMI, and when acted upon, the thin client HMI sends data representative of the interaction back to the originating device where the source application or code is being executed. It should also be noted that any of the policies may apply to some or all of the individual visualizations of the combined visualization, where desired. For example, a particular thin client HMI may receive particular content (e.g., for a combined visualization) and display it in a particular location, all in accordance with the policies and combined visualization configuration, and the content thus delivered and displayed may be changed (or even discontinued) in the event a different user is viewing or interacting with the device, the device moves to a different location, and so forth, as defined by the policies.

FIGS. 5A-E illustrate example interface screens of software adapted to facilitate definition and configuration of combined visualizations. Each of these may be defined by programming code executed on the configuration terminal (which in some cases may even serve as the visualization manager). In the screen 118 of FIG. 5A, the user may define a "virtual screen", corresponding to the combined visualization being configured. One or more standard layouts 122 may be displayed and the user may select a desired layout (e.g., number of insets or individual visualizations, their relative sizes and positions, etc.). For each of the individual visualizations, a desired position and size may be specified, as indicated at 124. As indicated at 126, a particular individual visualization (referred to in the screen as a "display client" may be selected for each location or inset forming the combined visualization. In the view 128 of FIG. 5B, then, an example combined visualization 130 may be generated and displayed in the configuration interface, with each visualization or inset 132 being positioned as it would be during actual operation of the automation system. This combined visualization may be named and its individual visualizations listed or otherwise presented as indicated by 134. Of course, each of these may be separately accessed, and its data viewed (e.g., program, source, etc.). It should be noted that the individual visualizations may originate from the same or different automation devices (or indeed any device running an application that accesses or generates a display or visualization). As shown in the further screen 136 in FIG. 5C, in some or all of the tiles of the combined visualization the layout may be further subdivided into smaller insets 138, each of which may draw upon the same or different source devices for their content/visualization. These may be listed and their data viewed as indicated at 140.

Figure 5A:
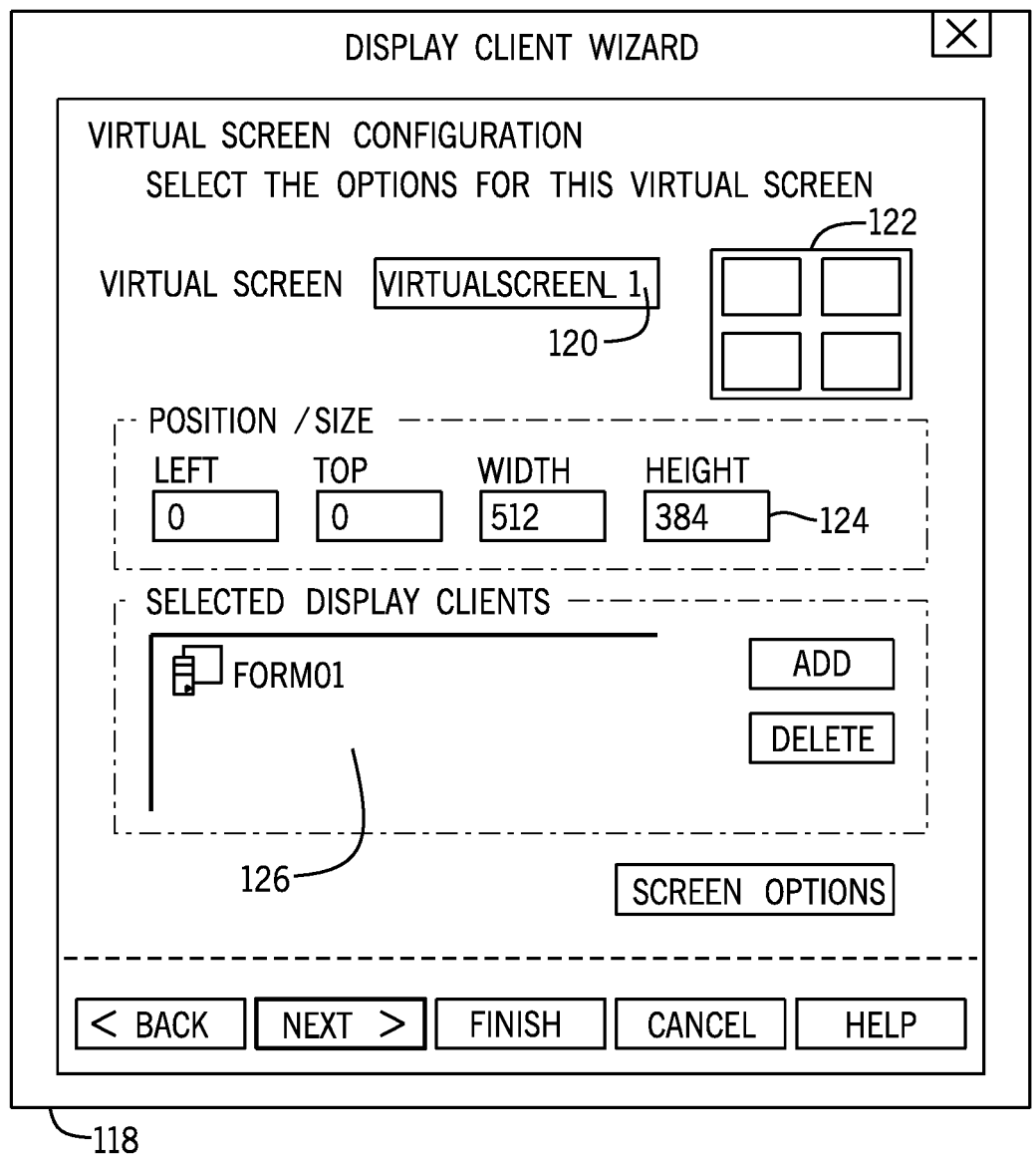
FIGS. 5A-5E are example screens for creating a layout configuration of a combined visualization by the method of FIG. 4.
Figure 5B:
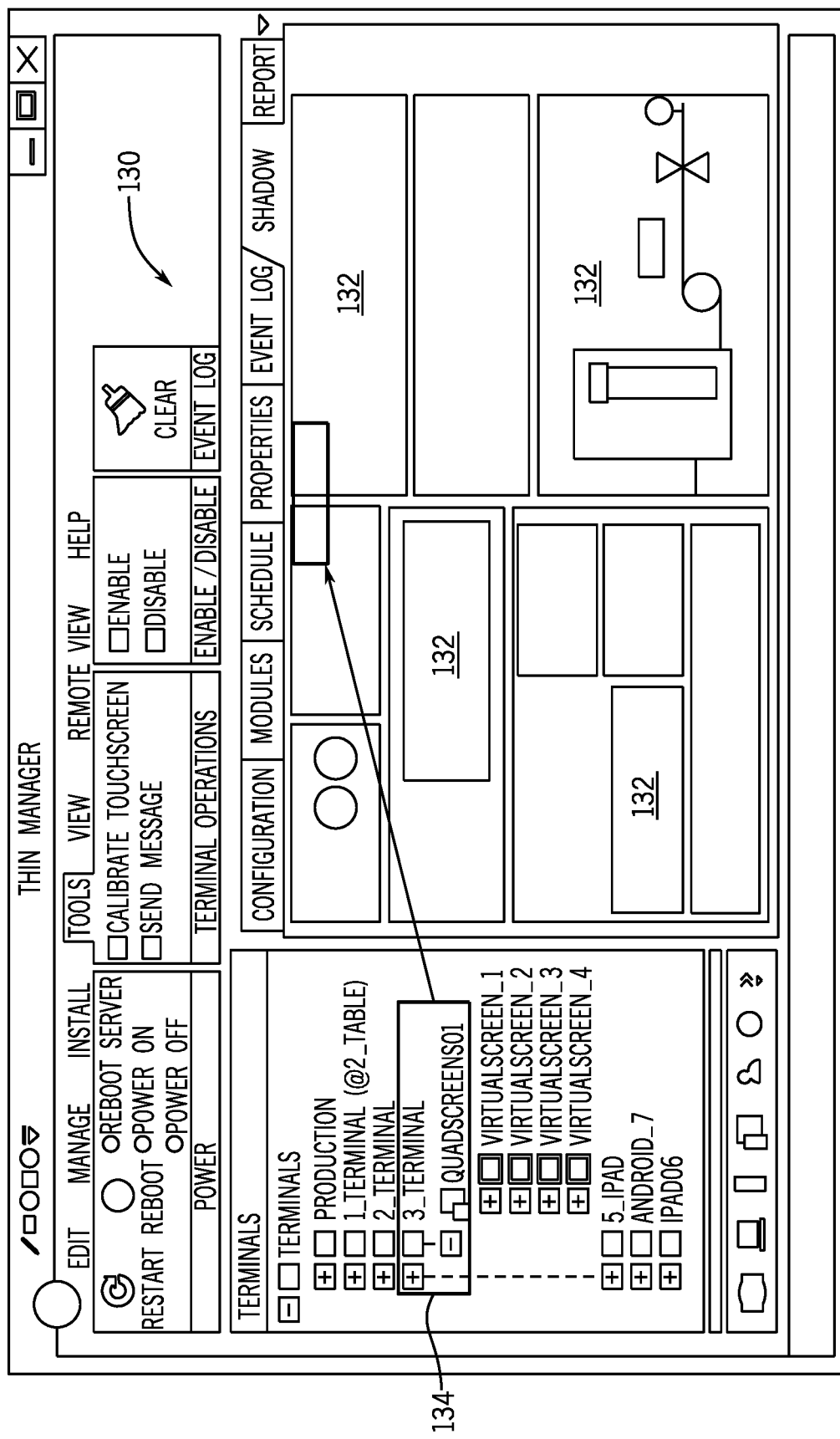
Figure 5C:
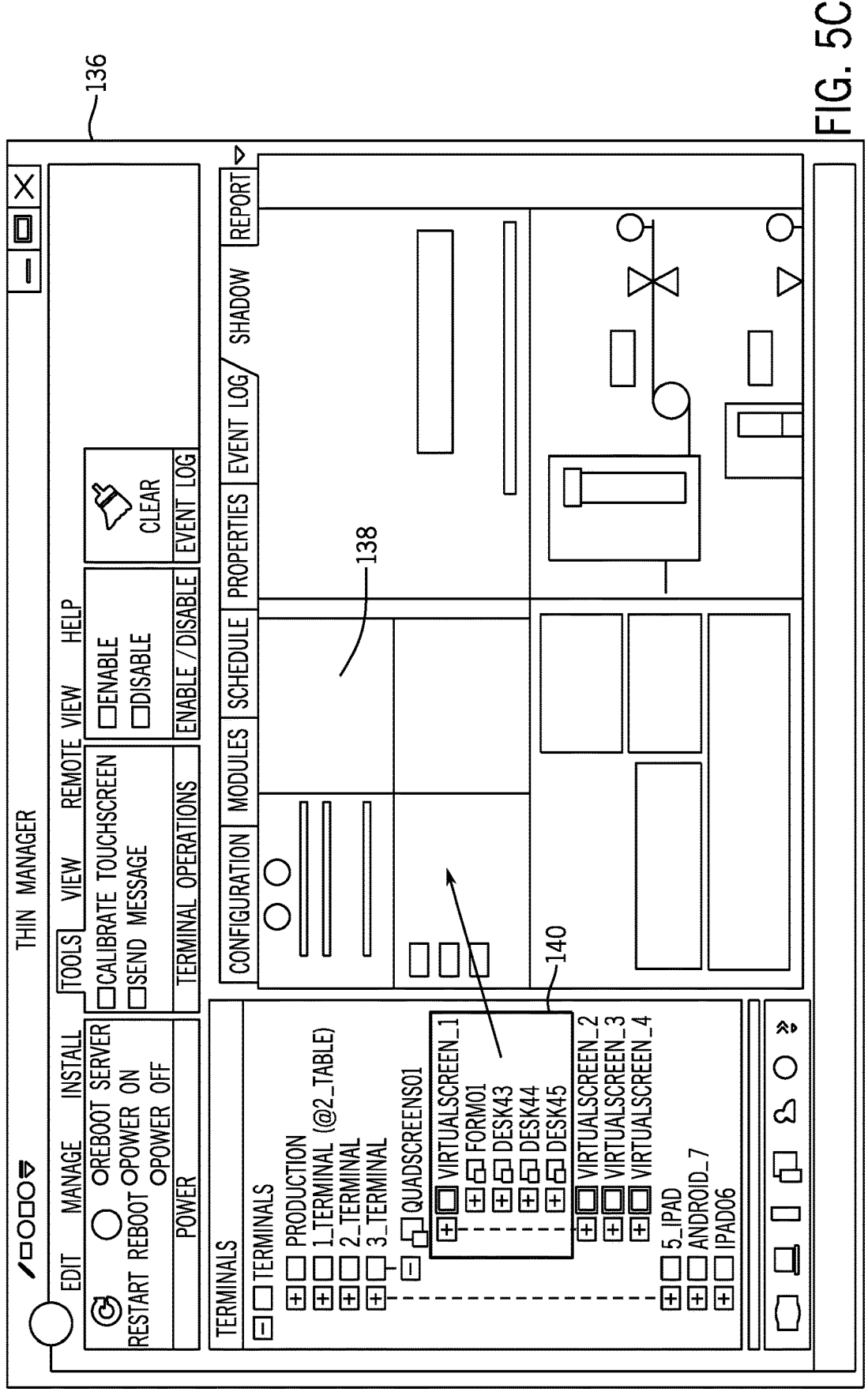
Figure 5D:
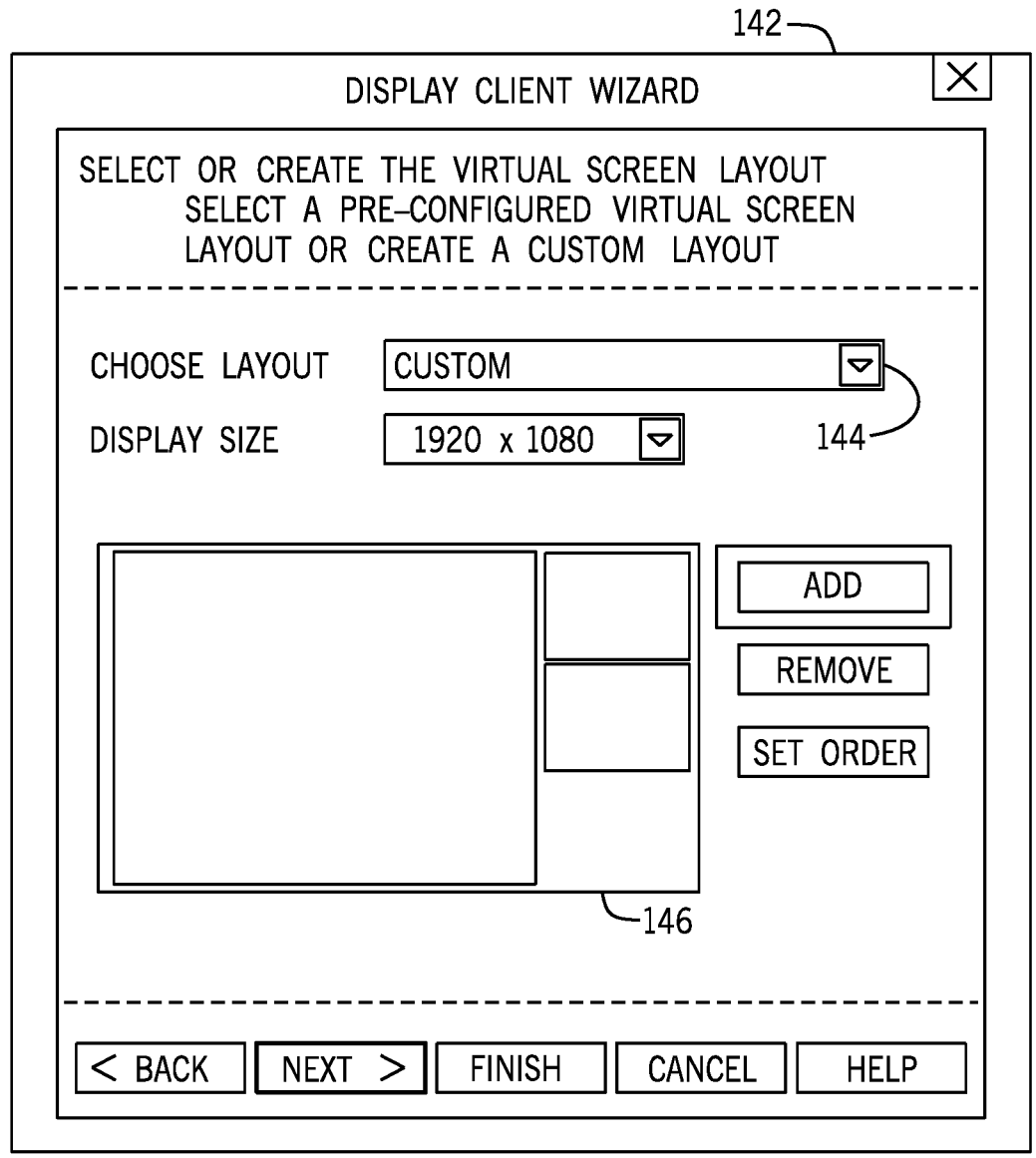
Figure 5E:
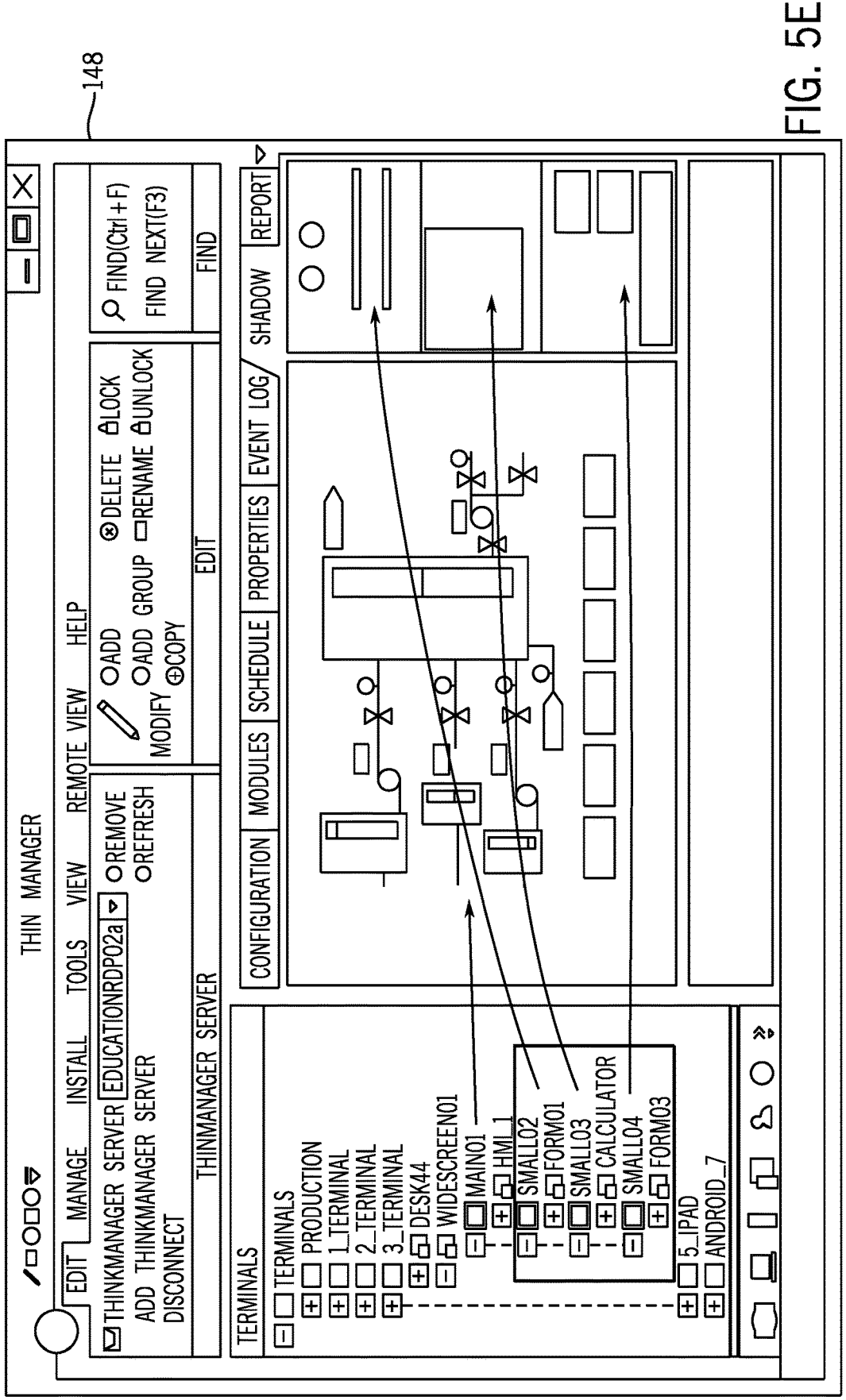

In some cases, it may be useful to allow non-standard or customized layouts of the combined visualizations, as indicated by interface screen 142 in FIG. 5D. In such cases, the configuration may allow for naming the layout and its dimensions, as indicated at 144. A view of the layout may be presented, as shown at 146. Also, in some cases the layout may allow a user to move, swap, or otherwise manipulate the insets or tiles. Similarly, as shown in the screen 148 of FIG. 5E, such custom layouts, the configuration may allow for creating an example combined visualization in which the individual visualizations are placed as they will be in operation.

Once established, as discussed above, configurations of the combined visualizations are served to the thin client HMIs (and thereby to the users) according to the established policies. FIGS. 6A-6D illustrate examples of how the combined visualizations may be generated, displayed, and interacted with. As shown in FIG. 6A, the visualization manager 40 provides the configuration 48 to the thin client HMI. In currently contemplated embodiments, the operating system and configuration are provided and remain active so long as the thin client HMI is connected to and authorized for access to the visualization manager and to systems required for the visualizations. The combined visualization 150, here similar to that configured in accordance with the above example, comprises multiple areas or insets in which the different visualizations are displayed, including a main or primary area 152, and secondary areas 154, 156, and 158. Here again, these are defined by the pre-established configuration, as are the sources of the displayed visualizations, indicated here by reference numerals 160, 162, 164, and 166, respectively. As noted above, these individual visualizations may comprise any desired screens, pages, or the like, and are generated by the source (e.g., an automation controller, another HMI, a remote computer, a camera, etc.), and accessed by the thin client HMI based upon the delivered configuration.

A number of activities or interactions may then be permitted, and these again may be defined by the policies and configurations. In presently contemplated embodiments there may be several different types of interaction, and each of these may or may not require interactivity with outside components. For example, as shown in FIG. 6B, a user may touch or otherwise provide input via one or more virtual features 168 displayed on the visualization. The meaning of such interactions, and responses to them, will in this example, be governed by the code or application executed by the source of the visualization, in this case visualization 152 from source 160. The action of the user is encoded and conveyed to the source without requiring involvement of the visualization manager. In many cases, such interactions may be for the performance of automation tasks (e.g., starting or stopping, or otherwise controlling equipment). It should be noted, however, that the ability or right to perform such interactions is governed by the policies set and stored by the visualization manager. Thus, specific users, specific user roles, specific locations, specific devices and so forth may be used as the basis for allowing or disallowing some of the functionality and operations.

As shown in FIG. 6C, other interactions may be at least partially automated, and may result in one or more changes in the combined visualization. In this example, the visualization is compiled essentially as shown in FIG. 6A. The configuration provided for this visualization may have taken into account policy factors, such as user, role, location, and device (among others). When a change is made to one or more of those factors, as indicated by reference numeral 172, then, the configuration may change accordingly, based upon recognition of the change. By way of example, the user may move to a different location or zone where other or different information is more relevant than was accessed and displayed at the first location. In the illustrated example, the new revised configuration 48' causes the thin client HMI to access a different visualization 174 from a fifth source 176, and another visualization 178 from a further source 180. In this example, the other visualizations 154 and 156 did not change. Any number of such automated or semi-automated changes may be made to the visualizations, to their sources, and to the combined visualization based upon appropriately established policies.

As a further example, FIG. 6D shows a case in which the configuration of the combined visualization allows for "swapping" of locations between a primary visualization 152 and a secondary visualization 154. In this case, the move or swap is performed by a user as indicated by reference numeral 182. Such operations may allow the user to focus more clearly upon one or the other visualization, such as for interaction with an automation component that provided the visualization. Is may be noted that in currently contemplated embodiments this type of interaction does not require access to either the visualization manager or the source component, but takes place only on the thin client HMI.

Figure 7:
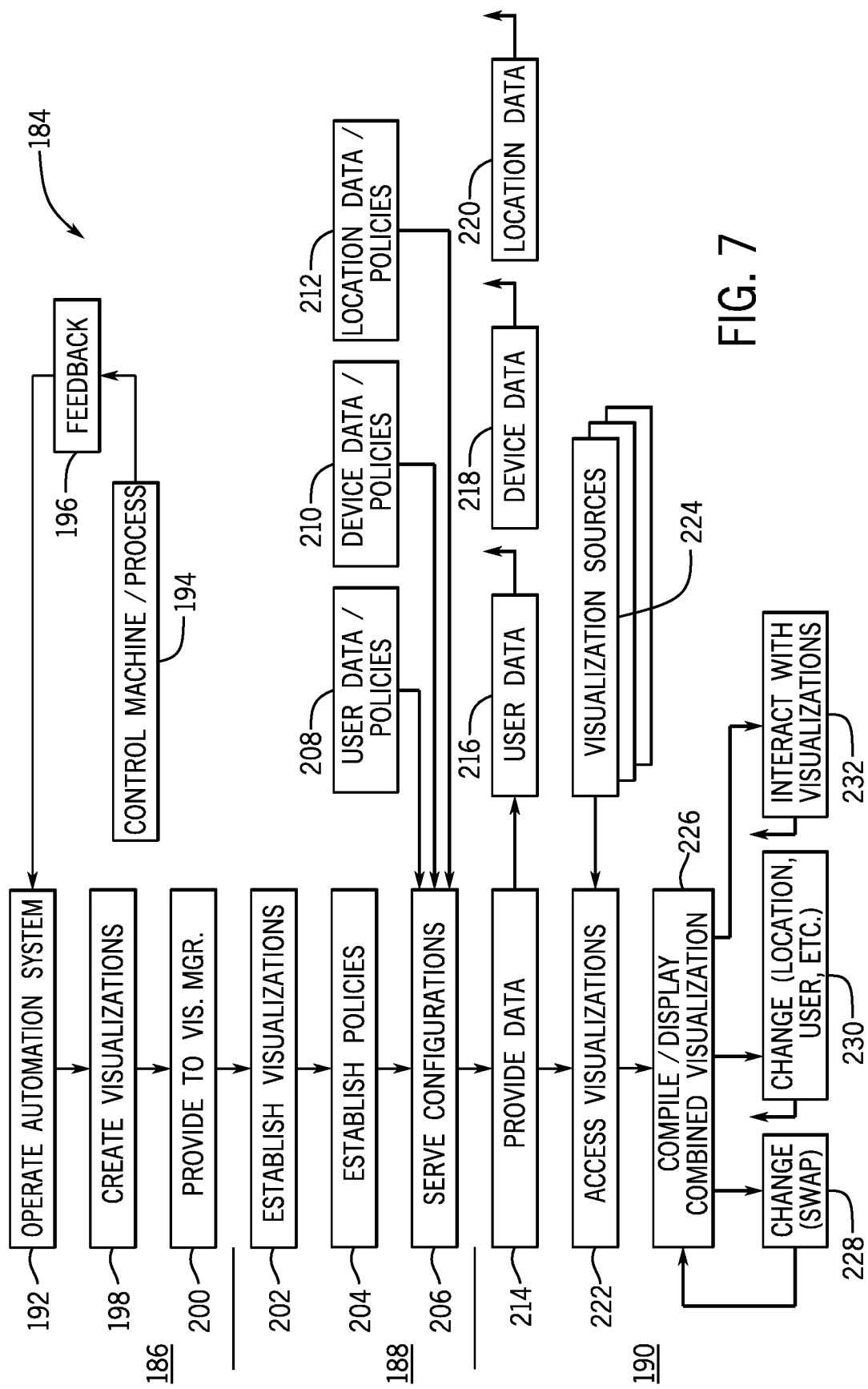
FIG. 7 is a flow chart of example logic for how a combined visualization may be compiled and created, displayed and interacted with in a thin client HMI, including during control and/or monitoring of a machine or process.

FIG. 7 illustrates example logic 184 for operations involving the combined visualizations. The logic may be viewed in terms of certain phases involved in creating and using the combined visualizations. For example, in phase 186 the underlying visualizations are created and provided; in phase 188 combined visualizations and policies are created, and relevant data is determined; and in phase 190 the combined visualization is created, displayed, and interacted with, or altered based on the policies. In practice, all of these phases may be ongoing and performed in real or near-real time during control and/or monitoring of the machines or processes.

In automation applications, in the first phase the automation system is operated to control one or machines or processes, as indicated at 192. Such operation will typically produce data and power signals that control the machine or process, as indicated at 194, such as by control of actuators as discussed above. Sensors will provide feedback 196 for regulation of this operation. At the same time, one or more of the automation devices (e.g., automation controllers, motor drives, HMIs, etc.) will create visualizations (e.g., real or near-real time views of the machines or processes, schematics, documentation, virtual instrumentation, camera views, or any other useful visual representations), as indicated at 198. These are then provided or made available to the visualization manager at 200.

In the next phase 188, the desired visualizations and combined visualizations are selected as discussed above, and the combined visualizations are defined and their configurations stored, as indicated at 202. At 204, the policies are also developed and stored as discussed above. During operation, then, the configurations are served by the visualization manager to the thin client HMIs, as indicated at 206. These may be provided based upon automatically determined or monitored criteria, user-input criteria, and so forth, as indicated by reference numerals 208, 210, and 212. Such factors may be continuously monitored to allow for changing individual or combined visualizations in accordance with the established policies.

In the further stage 190, during use, data may be provided at 214, including user data 216, device data 218, and location data 220 (along with any other useful data) that may serve as the basis for implementing the policies and displaying visualizations determined to be most useful in accordance with the policies. At 222, the thin client HMI accesses the visualizations from sources 224 as set forth in the received configuration (and again based on the policies). Utilizing the received individual visualizations, then, the combined visualization is compiled and displayed to the users on the thin client HMI device, as indicated at 226.

Any desired and permitted changes, interactions, and alterations may then take place as discussed above. Permitted interactions may be done by the user at 228, such as to swap insets, or otherwise interact with the thin client HMI. It should be noted that where the thin client HMI has other functionality (e.g., as a network-connected device, phone, computer, etc.) such functionality is not generally precluded by the creation, display, or interaction with the combined visualization. Indeed, certain of the visualizations may allow for or include links to websites, network locations, IP addresses, or other tools that allow the thin client HMI to receive information, notifications, and so forth, or to provide information that might be useful to other components or users. As noted above, based on the policies, the content, including one or more of the individual visualizations of the combined visualization, or even the entire combined visualization may be altered in real or near-real time by changing the user, the role, the device, or the location of the user or device, as indicated by 230 in FIG. 7. Still further, any permitted interactions with the source automation components may be performed by the user via one or more of the visualizations, as indicated by 232.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A non-transitory computer readable medium storing a program causing a computer to execute a method for a physical processor comprising:
   providing, via a visualization manager comprising a hardware device having a predetermined configuration of a layout of a combined automation visualization, the configuration to a human machine interface that is a thin client to cause the thin client to access a plurality of visualizations from a respective plurality of industrial automation visualization sources of a controlled machine or process, the configuration defining specific individual visualizations to be included in the combined visualization, the location and layout of the individual visualizations in the combined visualization, and the industrial automation sources of the individual visualizations;
   wherein the visualization manager stores policies for controlling access by the thin client to the individual visualizations based at least upon user, location, and thin client; and
   wherein the configuration is provided to the thin client itself and the thin client itself accesses and displays the visualizations from the respective sources during operation of the sources based on the received configuration without creating the visualizations internally.

2. The non-transitory computer readable medium of claim 1, wherein the industrial automation visualization sources comprise an automation controller configured to generate an automation visualization of at least a portion of the controlled machine or process, and wherein the combined visualization comprises an area reproducing the automation visualization.

3. The non-transitory computer readable medium of claim 1, wherein the industrial automation visualization sources comprise an automation controller configured to generate a process control screen, and therein the combined visualization comprises an area reproducing the process control screen.

4. The non-transitory computer readable medium of claim 1, wherein the industrial automation visualization sources comprise camera creating images of at least a portion of the controlled machine or process, and wherein the combined visualization comprises an area reproducing the images.

5. The non-transitory computer readable medium of claim 1, wherein one or more configurations provided by the visualization manager to the thin client causes the thin client to access at least one different visualization for the combined visualization based upon at least one of a change in user or location of the thin client automatically and without user input.

6. The non-transitory computer readable medium of claim 1, wherein the combined visualization comprises a plurality of areas including one area for each of the plurality of visualizations, and wherein at least one of the areas comprises a primary area for the controlled machine process, and wherein the primary area is user swappable with a secondary area where a different visualization is displayed.

7. The non-transitory computer readable medium of claim 6, wherein the primary area is swappable with the secondary area only when permitted by the configuration.

8. The non-transitory computer readable medium of claim 1, wherein at least one of the visualizations permits user interaction with the industrial automation visualization source that creates the respective visualization, and wherein the user interaction comprises a command that is interpreted by the industrial automation visualization source that creates the respective visualization and is utilized for control of the controlled machine or process.

9. A non-transitory computer readable medium storing a program causing a computer to execute a method for a physical processor comprising:
   providing via a visualization manager comprising a hardware device having a predetermined configuration of a layout of a combined automation visualization, the configuration to a human machine interface that is a thin client to cause the thin client to access the respective visualizations from a plurality of industrial automation components, the configuration defining specific respective visualizations to be included in the combined visualization, the location and layout of each respective visualization in the combined visualization, and an industrial automation component that creates each respective visualization;
   wherein the visualization manager stores policies for controlling access by the thin client to the individual visualizations based at least upon user, location, and thin client;
   wherein the configuration is provided to the thin client itself;
   wherein the plurality of industrial automation components each performs a monitoring and/or control operation on a controlled machine or process, each of the industrial automation components creating a respective visualization of an aspect of the monitored and/or controlled operation; and
   wherein the thin client itself accesses and displays the visualizations from the respective sources during operation of the sources based on the received configuration without creating the visualizations internally.

10. The non-transitory computer readable medium of claim 9, wherein at least one of the industrial automation components comprises an automation controller configured to generate a control visualization of at least a portion of the controlled machine or process, and wherein the combined visualization comprises an area reproducing the control visualization.

11. The non-transitory computer readable medium of claim 10, wherein the control visualization permits user interaction with the automation controller that creates the control representation.

12. The non-transitory computer readable medium of claim 11, wherein the user interaction comprises a command that is interpreted by the automation controller and is utilized for control of the controlled machine or process.

13. The non-transitory computer readable medium of claim 9, wherein one or more configurations provided by the visualization manager to the thin client causes the thin client to access at least one different visualization for the combined visualization based upon at least one of a change in user or location of the thin client automatically and without user input.

14. A non-transitory computer readable medium storing a program causing a computer to execute a method for a physical processor comprising:
   storing a configuration of a combined visualization created by a human operator on a visualization manager, the combined visualization comprising area for placement of respective individual visualizations from respective industrial automation components each performing a monitoring and/or control operation on a controlled machine or process, each of the industrial automation components creating a respective individual visualization of an aspect of the monitored and/or controlled operation;
   providing the configuration to a human machine interface that is a thin client, wherein the configuration is provided to the thin client itself;
   accessing by the thin client from each of the respective industrial automation components the respective individual visualizations during monitoring and/or control of the controlled machine process; and
   compiling on the thin client the combined visualization based upon the configuration;
   wherein the visualization manager stores policies for controlling access by the thin client to the individual visualizations based at least upon user, location, and thin client; and
   wherein the thin client itself accesses and displays the visualizations from the respective sources during operation of the sources based on the received configuration without creating the visualizations internally.

15. The non-transitory computer readable medium of claim 14, wherein at least one of the industrial automation components comprises an automation controller configured to generate a control visualization of at least a portion of the controlled machine or process, and wherein the combined visualization comprises a tile reproducing the control visualization.

16. The non-transitory computer readable medium of claim 15, wherein the control visualization permits user interaction with the automation controller that creates the control representation.

17. The non-transitory computer readable medium of claim 16, wherein the user interaction comprises a command that is interpreted by the automation controller and is utilized for control of the controlled machine process.

18. The non-transitory computer readable medium of claim 14, wherein one or more configurations provided by the visualization manager to the thin client causes the thin client to access at least one different individual visualization for the combined visualization based upon at least one of a change in user or location of the thin client automatically and without user input.

19. The non-transitory computer readable medium of claim 14, wherein program instructions for creation of the visualizations are executed on the industrial automation components and not on the thin client.

* * * * *